(12) United States Patent
Paintin

(10) Patent No.: US 11,241,835 B2
(45) Date of Patent: Feb. 8, 2022

(54) SYSTEM AND METHOD FOR REMOTE PRODUCTION OF FINANCIAL INSTRUMENTS

(71) Applicant: The Western Union Company, Englewood, CO (US)

(72) Inventor: Scott R. Paintin, Littleton, CO (US)

(73) Assignee: The Western Union Company, Denver, CO (US)

( * ) Notice: Subject to any disclaimer, the term of this patent is extended or adjusted under 35 U.S.C. 154(b) by 944 days.

(21) Appl. No.: 14/040,013

(22) Filed: Sep. 27, 2013

(65) Prior Publication Data
US 2015/0095213 A1   Apr. 2, 2015

(51) Int. Cl.
| B29C 64/393 | (2017.01) |
| B33Y 50/00 | (2015.01) |
| B33Y 80/00 | (2015.01) |
| G06Q 20/34 | (2012.01) |

(52) U.S. Cl.
CPC ............ *B29C 64/393* (2017.08); *B33Y 50/00* (2014.12); *B33Y 80/00* (2014.12); *G06Q 20/349* (2013.01)

(58) Field of Classification Search
CPC .......... H04L 65/403; G06F 2221/2117; G06F 2221/2107; G07F 19/203; B33Y 50/02; B33Y 50/00; B33Y 80/00; G06Q 20/354; G06Q 20/1085; G06Q 20/349; G05B 2219/49007; B29C 64/393
See application file for complete search history.

(56) References Cited

U.S. PATENT DOCUMENTS

| 5,412,483 | A | * | 5/1995 | Ludlow | ................. | G06F 3/1295 |
| | | | | | | 358/1.16 |
| 5,533,172 | A | * | 7/1996 | Hurtz | .................... | G06F 3/1296 |
| | | | | | | 358/1.13 |
| 6,748,421 | B1 | * | 6/2004 | Ozkan | ................... | G06F 3/0481 |
| | | | | | | 348/E7.085 |
| 7,290,705 | B1 | * | 11/2007 | Shin | ....................... | G06Q 20/18 |
| | | | | | | 235/379 |

(Continued)

OTHER PUBLICATIONS

Fabbaloo by Daily news 3D printing; The 3D printer Virus Really; Apr. 17, 2010; 4 pages.*

(Continued)

*Primary Examiner* — Christine M Behncke
*Assistant Examiner* — Mary M Gregg
(74) *Attorney, Agent, or Firm* — Kilpatrick Townsend & Stockton, LLP

(57) ABSTRACT

Financial instruments are produced at a remote location by a 3D printer. In one embodiment, a request is made for a financial instrument, such as a prepaid gift instrument, by user system(s) at the remote location(s). The user system(s) may be at one or more of a retailer location, a money transfer agent location, or an instrument holder or recipient location (such as at an instrument holder/recipient's residence). An instrument issuer may transmit a print file to a user system which may in turn provide the print file to the 3D printer in order to produce the instrument. At least of a portion of the print file may be rendered unusable at the user system after being provided to or used by the 3D printer, in order to prevent use of the print file to produce unauthorized copies of the instrument.

16 Claims, 4 Drawing Sheets

(56) References Cited

U.S. PATENT DOCUMENTS

| | | | | |
|---|---|---|---|---|
| 7,328,190 B2* | 2/2008 | Smith | G06Q 20/04 | 235/375 |
| 7,406,603 B1* | 7/2008 | MacKay | G06F 21/10 | 713/189 |
| 8,223,399 B1* | 7/2012 | Lee | H04N 1/6033 | 358/1.9 |
| 8,781,300 B2* | 7/2014 | McCarthy | H04N 5/76 | 386/248 |
| 9,002,805 B1* | 4/2015 | Barber | G06F 17/30303 | 707/692 |
| 2002/0015168 A1* | 2/2002 | Schindler | G03B 27/521 | 358/1.12 |
| 2003/0018581 A1* | 1/2003 | Bratton | H04L 12/12 | 705/50 |
| 2003/0058084 A1* | 3/2003 | O'Hara | G07B 15/00 | 340/5.53 |
| 2003/0193542 A1* | 10/2003 | Kasahara | B41J 29/38 | 347/37 |
| 2004/0012812 A1* | 1/2004 | Shimizu | G06F 3/1205 | 358/1.15 |
| 2004/0091239 A1* | 5/2004 | Poslinski | H04N 5/76 | 386/297 |
| 2004/0114183 A1* | 6/2004 | Lee | G11B 20/00007 | 358/1.16 |
| 2004/0120596 A1* | 6/2004 | Ishii | H04N 1/6011 | 382/254 |
| 2005/0038714 A1* | 2/2005 | Bonet | G06Q 20/204 | 705/17 |
| 2005/0125292 A1* | 6/2005 | Kassab | G06Q 30/02 | 705/14.17 |
| 2005/0285894 A1* | 12/2005 | Nakayama | B41J 13/0009 | 347/35 |
| 2006/0054039 A1* | 3/2006 | Kritchman | B33Y 40/00 | 101/424.1 |
| 2006/0078230 A1* | 4/2006 | Kimura | H04N 1/2112 | 382/309 |
| 2006/0095657 A1* | 5/2006 | Rector | G06F 3/0608 | 711/111 |
| 2006/0163341 A1* | 7/2006 | Tulluri | G06Q 20/10 | 235/379 |
| 2006/0184673 A1* | 8/2006 | Liebman | G06F 17/3028 | 709/225 |
| 2007/0078713 A1* | 4/2007 | Ottt, IV | G06Q 30/02 | 705/14.61 |
| 2007/0250544 A1* | 10/2007 | Shibata | G06F 17/3012 | |
| 2008/0016228 A1* | 1/2008 | Cho | G06F 21/445 | 709/228 |
| 2008/0033725 A1* | 2/2008 | Peak | G06F 17/30038 | 704/260 |
| 2008/0091731 A1* | 4/2008 | Lee | G06F 17/30053 | |
| 2008/0189283 A1* | 8/2008 | Quoc | G06F 17/301 | |
| 2008/0241404 A1* | 10/2008 | Allaman | B29C 64/165 | 427/333 |
| 2009/0051969 A1* | 2/2009 | Yoo | H04N 1/00204 | 358/1.16 |
| 2009/0063581 A1* | 3/2009 | White | G06F 17/30873 | |
| 2009/0125699 A1* | 5/2009 | Beadnell | G06F 3/0607 | 711/173 |
| 2009/0128851 A1* | 5/2009 | Park | H04N 1/00347 | 358/1.15 |
| 2010/0214598 A1* | 8/2010 | Hoppenot | G06F 3/1205 | 358/1.15 |
| 2010/0318810 A1* | 12/2010 | Strom | G06F 21/79 | 713/190 |
| 2011/0158660 A1* | 6/2011 | Suzuki | G03G 15/23 | 399/8 |
| 2011/0193994 A1* | 8/2011 | Nozawa | H04N 5/772 | 348/231.3 |
| 2011/0255111 A1* | 10/2011 | Oba | G06F 3/1247 | 358/1.13 |
| 2011/0313878 A1* | 12/2011 | Norman | G06Q 30/0621 | 705/26.5 |
| 2012/0002226 A1* | 1/2012 | Zhan | G06F 3/1205 | 358/1.11 |
| 2012/0019867 A1* | 1/2012 | Prati | G06F 3/1204 | 358/1.15 |
| 2012/0023128 A1* | 1/2012 | Sammon | G06F 17/3002 | 707/769 |
| 2012/0033236 A1* | 2/2012 | Tsugimura | G06F 3/1206 | 358/1.2 |
| 2012/0117659 A1* | 5/2012 | Gearhart | G06F 21/10 | 726/27 |
| 2012/0215811 A1* | 8/2012 | Tipper | G06F 21/16 | 707/781 |
| 2012/0246288 A1* | 9/2012 | Kikuoka | G06F 3/1222 | 709/223 |
| 2012/0308805 A1* | 12/2012 | Sella | B29C 31/10 | 428/222 |
| 2013/0015596 A1* | 1/2013 | Mozeika | B25J 9/0084 | 264/40.1 |
| 2013/0027739 A1* | 1/2013 | Gilg | G06F 21/608 | 358/1.15 |
| 2013/0077113 A1* | 3/2013 | Rolleston | G06F 3/1208 | 358/1.13 |
| 2013/0085968 A1* | 4/2013 | Schultz | G06F 21/32 | 705/400 |
| 2013/0163008 A1* | 6/2013 | Edwards | G06F 3/1219 | 358/1.6 |
| 2013/0191636 A1* | 7/2013 | Aramaki | G06F 21/44 | 713/168 |
| 2013/0235412 A1* | 9/2013 | Baldwin | G06F 3/1238 | 358/1.14 |
| 2014/0058959 A1* | 2/2014 | Isbjornssund | G06F 21/10 | 705/310 |
| 2014/0079297 A1* | 3/2014 | Tadayon | G06K 9/00 | 382/118 |
| 2014/0198339 A1* | 7/2014 | Kothari | G06F 3/1206 | 358/1.15 |
| 2015/0052000 A1* | 2/2015 | Apsley | G06Q 30/0621 | 705/26.5 |
| 2015/0088290 A1* | 3/2015 | Ghosh | G06F 17/50 | 700/98 |

OTHER PUBLICATIONS

DIY BioPrinter by Patrik; 10 pages; (Jan. 2013-Nov. 2018) (Year: 2013).*

How 3-D Printing Works by Stephanie Crawford; 3 pages ; (Sep. 2011-Oct. 2017) (Year: 2011).*

A Brief History of 3D Printing by Price; 1 page; (Feb. 2013-Dec. 2017) (Year: 2013).*

Exploiting Intellectual Property Assets: Licensing, Franchising and Merchandising by Kushner (Year: 2010).*

* cited by examiner

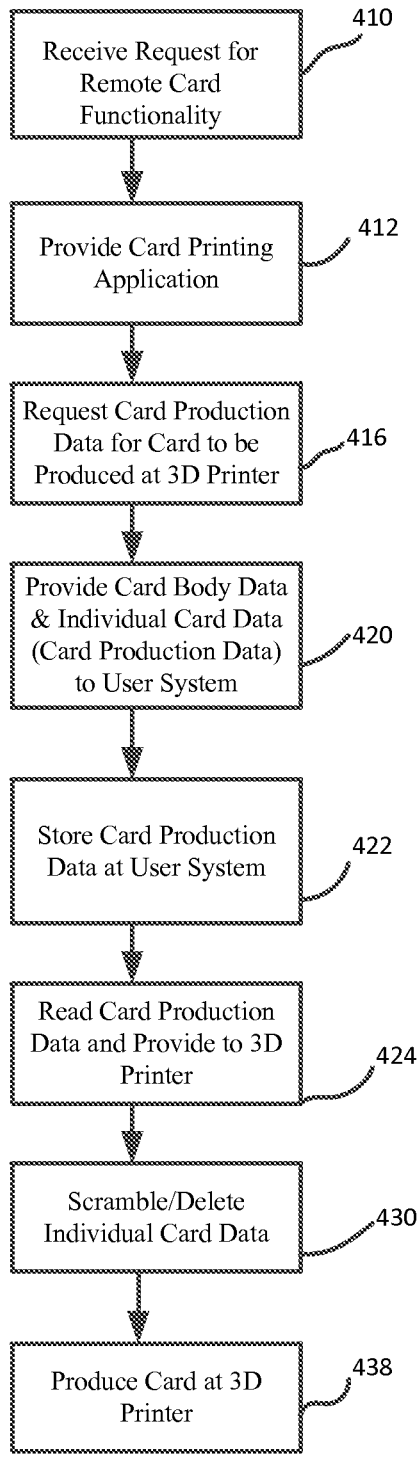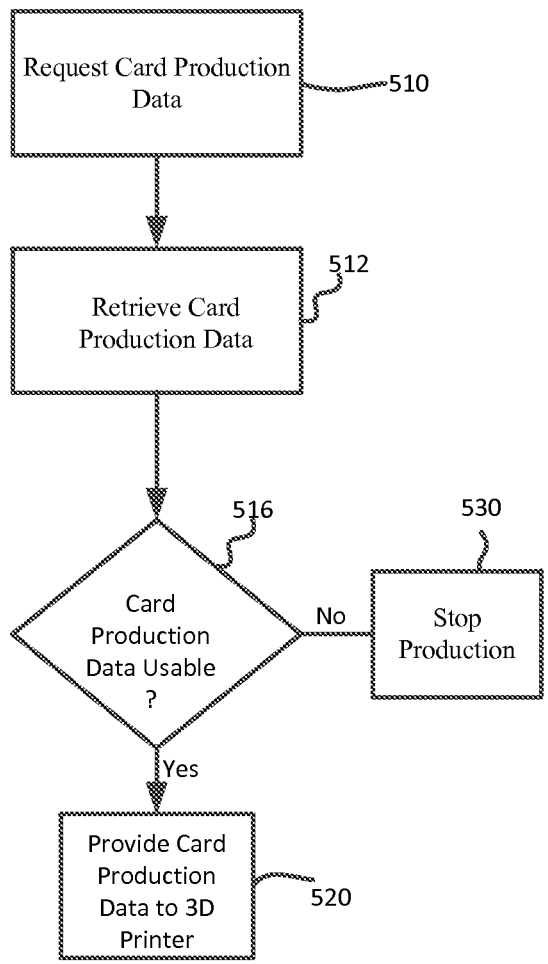
FIG. 4
FIG. 5

SYSTEM AND METHOD FOR REMOTE PRODUCTION OF FINANCIAL INSTRUMENTS

BACKGROUND OF THE INVENTION

Financial cards, such as credit cards, debit cards, ATM cards, smart cards and gift cards, are typically produced in large quantities at a card production facility and then shipped in bulk to retailers or mailed individually to cardholders.

For example, a retailer may order a quantity of gift cards from the production facility and put them on display for purchase by customers, or a customer may purchase a gift card online and have the gift card mailed from the production facility to the customer or another party (e.g., a recipient).

As another example, in a money transfer transaction, a money recipient may desire to get the transferred money in the form of a money card (e.g., stored value card), so that the value on the card may be used as it is needed rather than the recipient having to carry cash. Such cards are usually kept in stock at a money transfer location, and then individually loaded with the value when requested by a recipient at the money transfer location.

There is cost to retailers and others in the supply chain when producing large quantities of gift cards and keeping them in inventory until purchased or used. Likewise a customer ordering a gift card online may want to have the card immediately available without waiting for it to be shipped from the card production facility.

Thus, there has arisen a need for production of instruments at remote locations, such as at a retailer location, money transfer agent location, instrument holder location, or recipient location where instruments may be produced individually (possibly on demand) rather than being shipped from an instrument production facility.

BRIEF SUMMARY OF THE INVENTION

There is provided, in accordance with embodiments of the present invention, a network/system and method for producing a financial instrument at a remote location. The financial instrument may be produced with the use of a 3D printer at the remote location.

In one embodiment, a method includes receiving, at a host computer system, a request from a user system at the remote location for a financial instrument, and, in response to the request, generating at the host computer system a print file, the print file having one or more data elements defining the manner in which instrument material is deposited in order to produce a financial instrument. The method further includes sending, from the host computer system, the print file to the user system, storing the print file at the user system for use by a 3D printer, providing the print file from the user system to the 3D printer, and producing the financial instrument at the 3D printer.

A more complete understanding of the present invention may be derived by referring to the detailed description of the invention and to the claims, when considered in connection with the Figures.

BRIEF DESCRIPTION OF THE DRAWINGS

FIG. 4 is a flow diagram illustrating a process for producing a financial instrument in the system seen in FIG. 1.

FIG. 5 is a flow diagram illustrating a process for accessing instrument production data from a print file in the user system seen in FIG. 1.

DETAILED DESCRIPTION OF THE INVENTION

Figure 1:
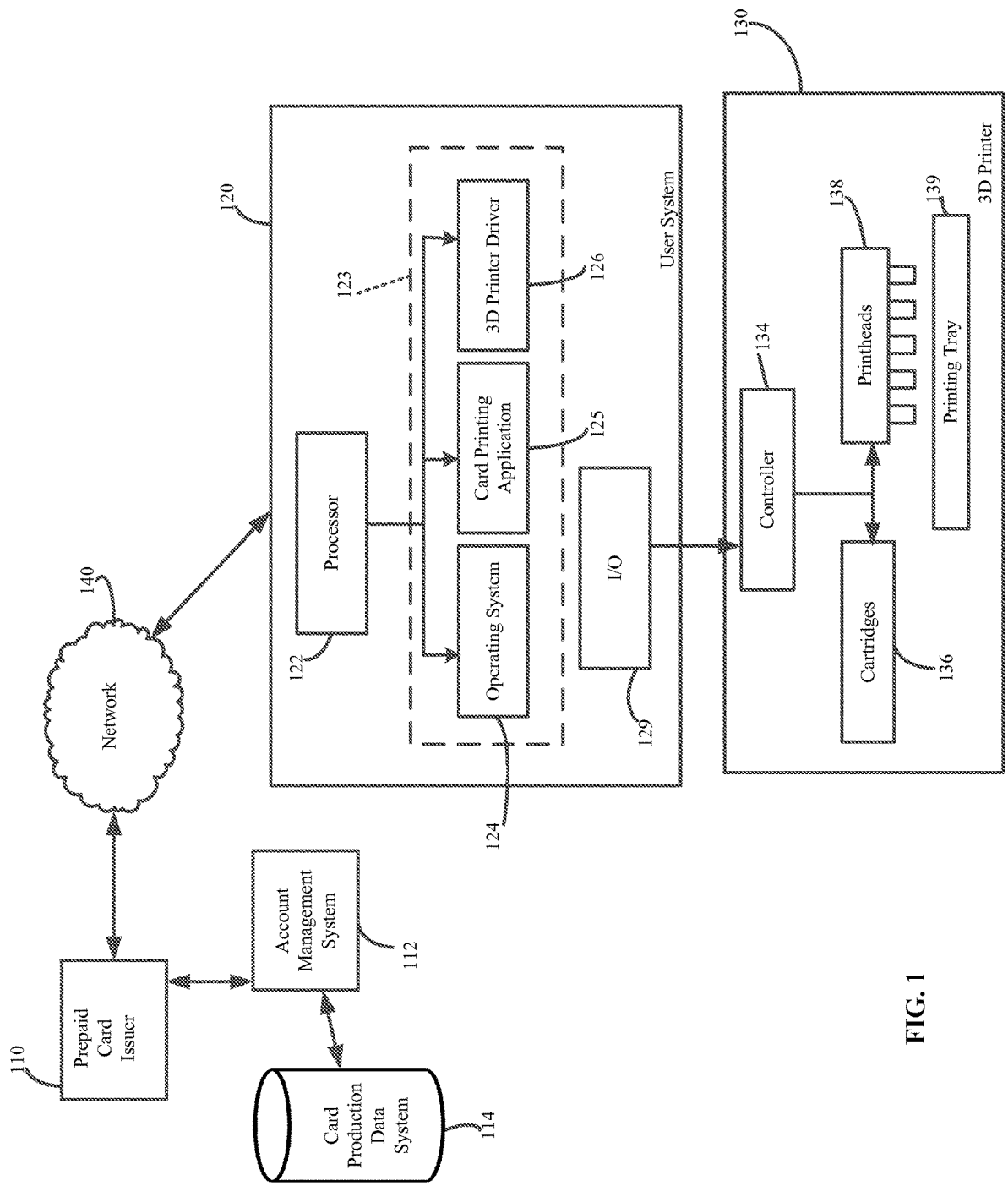
FIG. 1 is a general block diagram illustrating a system for producing financial instruments at a remote location.

There are various embodiments and configurations for implementing the present invention. Broadly speaking, embodiments of the invention provide for the production of a financial instrument at a remote location of a user. As an example, the user may be a clerk at a retail location, where a gift instrument (such as a gift card) or stored value instrument (such as a general purpose reloadable prepaid card) is produced for a customer desiring to purchase the gift instrument or stored value instrument. As another example, the user may be an agent at a money transfer location, where a money recipient desires to receive cash from a money transfer in the form of a stored value instrument. In yet another example, the user may be a consumer who wants to purchase a gift instrument online, and have the gift instrument produced at the user's location (e.g., at the user's home) or at a recipient's location (e.g., at the recipient's home or office) after the gift instrument has been ordered online.

In embodiments of the invention, the financial instrument is produced at a 3D printer associated with a remote user system. Briefly, a 3D printer is a device that may have general features similar to a traditional printer, but rather than depositing ink to paper, a 3D printer deposits successive, thin layers of material (such as photopolymers, wax, powders, plastics, metal alloys and other suitable compositions) in order to produce ("print") a three-dimensional object. Details concerning a 3D printer that may be configured to produce financial instruments will be provided later in the description.

Instrument production data is provided to the 3D printer in order to produce a financial instrument. Since a financial instrument may represent value (such as money that might be stored in an account associated with or identified by the instrument), embodiments of the present invention prevent the use of the instrument production data to produce unauthorized copies of the instrument. In one embodiment, instrument production data includes both instrument body data and individual instrument and/or account data. Instrument body data is used by the 3D printer to produce elements of a instrument that are common to multiple instruments/instrument holders, such as the overall dimensions of the instrument, the structure of the instrument substrate, and visual elements (general instrument appearance, brands, logos, and so forth) that are not unique to any individual instrument holder. Individual instrument and/or account data is used by the 3D printer to produce elements of the instrument that are unique to the instrument holder and/or the instrument holder's account, such as a instrument holder name, account number and other personalized information or graphics (e.g., customized designs/pictures provided or selected by the instrument holder or the instrument purchaser).

In some embodiments, the user system is programmed to delete or render unusable (e.g., by scrambling or overwriting) individual instrument and/or account data stored in a print file at the user system after a financial instrument has been produced by the 3D printer.

The term "instrument" is used herein for convenience. It generally refers to any object that can be used by an account holder in order to conduct a transaction. It should be appreciated that embodiments of the invention are not limited to production of instruments having a card-like structure, but rather could include instruments that might be produced in many different tangible forms at a 3D printer. Thus the term "instrument" is intended to encompass any instrument having value or account information associated therewith, and that might be used to conduct a transaction. As examples only, non-card-like instruments could include many kinds of physical objects carried by an account holder, such as keys, jewelry, small sculptures, and other objects which may have instrument holder and/or account data incorporated therein or represented thereon.

Turning now to FIG. 1, there is illustrated a system for producing a financial instrument at a remote user location in accordance with one embodiment of the invention. In the illustrated embodiment, the system produces prepaid instruments, such as gift instruments, that are provided to an instrument holder (which may be the instrument purchaser and/or the instrument recipient) and may be used by the instrument holder to conduct a transaction. As seen, a prepaid instrument issuer 110 may have various associated systems, including an account management system 112 and an instrument production data system 114. The account management system 112 manages accounts that are associated with instruments, such as creating and maintaining accounts and account numbers for those accounts, managing account balances, tracking transactions conducted against accounts, and managing other data associated with accounts, such as instrument production data that is used to produce prepaid instruments. The instrument production data may be created at the account management system 112 based on parameters established by the prepaid instrument issuer 110 and may be stored in data system 114. Upon request by a user, the instrument production data may be retrieved and transmitted through the instrument issuer to a user system 120 having an associated 3D printer 130. A user may be an instrument purchaser (e.g., a customer or consumer), a clerk or employee at a retail location or money transfer location, or a recipient, and the user making the request may be the same as or different from the operator of the user system. The prepaid instrument issuer 110 may be connected to the user system 120 and/or its associated 3D printer 130 through a network 140. In described embodiments, the user system 120 and 3D printer 130 are situated remotely from the prepaid instrument issuer 110, at a location where a prepaid instrument is to be provided to an instrument holder after produced at the 3D printer 130. Given that the user system may be remote from the prepaid instrument issuer, the network 140 may be a wide-area network and could be implemented in various forms, such as by a dedicated private telecommunications network or by a public network (e.g., the Internet).

In one embodiment, the user system 120 is located at a retailer where prepaid instruments may be sold to customers. The customer may use the prepaid instrument to conduct transactions, such as to make purchases or receive cash back at a merchant or make withdrawals from automated teller machines (ATM), the customer or may provide the instrument to a recipient (e.g., as a gift). In such an embodiment, the user system is operated by a clerk or other employee of the retailer (which may also be a money transfer location) and is used by such clerk/employee to produce a prepaid instrument on demand and for purchase by a customer. In another embodiment, the user system 120 is located at a money transfer location where the recipient of the money transfer may pick up money transferred by a sender. In such case, the sender may direct or the recipient may request that, rather than receiving the transferred money entirely in cash, the money be provided, at least in part, in the form of a stored value instrument which may be used (along with a stored value account associated with the instrument) to conduct transactions, such as to make purchases or receive cash back at a merchant or make a withdrawal from an ATM.

In yet other embodiments, the user system 120 may be a personal computing device (desktop, laptop, notepad, tablet, smart phone or similar computing device) at a consumer location, such as at the consumer's residence or office. The consumer may use the user system 120 to order a gift instrument. For example, a greeting card with a gift instrument enclosed or a certificate with a gift instrument included. The greeting card (or certificate) and/or gift instrument might be personalized, at least in part, for the consumer or other intended recipient. A print file with at least a portion of the production data for the greeting card (or certificate) and/or gift instrument may be sent via electronic mail to the consumer (the person ordering the gift instrument) to be provided to the recipient or may be sent via electronic mail directly to another recipient. Alternatively, a portion of the production data for the greeting card (or certificate) and/or gift instrument may be made available for download by the consumer or the recipient. In such embodiments, the consumer, user or recipient operating the user system 120 might have both a traditional printer (not shown) to print a personalized greeting card or certificate and a 3D printer (such as 3D printer 130) to produce a gift instrument. In addition to, or instead of, the personalized greeting card, the 3D printer may be utilized by the consumer, user or recipient to print an object (e.g., a box, trophy, plaque, picture frame, etc.) that may accompany the gift instrument, and such object may be personalized, at least in part, or may not be personalized at all. In all instances, the consumer, user or recipient may have the option of only printing a portion of the relevant bundle (e.g., greeting card, certificate, gift instrument and/or object). The user system used to order the gift instrument may be the same as or different from the user system that communicates with the 3D printer. Also, the operator of the user system(s) may be the same person or may be distinct persons (e.g., the customer or consumer, a clerk or employee at a retail location or money transfer location or the recipient).

Various examples of components that might be used to implement user system 120 will be provided later in conjunction with FIG. 6. However, for purposes of understanding the invention, components of the user system 120 are generally illustrated in FIG. 1 and may include a processor 122 and a memory/storage system 123 that stores (among other things) various software programs, such as an operating system 124, a instrument printing application 126 and a 3D printer driver 138. The operating system 124 controls the overall operations and flow of data within the user system 120, including data that may be stored in association with the instrument printing application 126 and the 3D printer driver 138. The instrument printing application 126 may control the operation of the 3D printer 130 in response to various commands made by the user at user system 120. The instrument printing application 126 may be provided to the user system in advance of producing an instrument, such as by software code transferred from the prepaid instrument issuer 110 when the user system initially requests the ability to produce prepaid instruments issued by the prepaid instrument issuer 110. The 3D printer driver may be provided by the manufacturer of the 3D printer and, in a manner similar to traditional printer drivers, may be hardware-dependent and translates and forwards particular types of commands and data (in a form understood by the 3D printer) from the operating system 124 and instrument printing application 126, for use by the 3D printer 130 when producing a prepaid instrument. The user system 120 includes an input/output interface 129 through which commands and data are passed between the user system 120 and the 3D printer 130.

The 3D printer 130 includes components that are known to those in the art. As illustrated in FIG. 1, such components include a controller 134 that receives commands and data from the user system 120 and controls the operation of cartridges 136 which maintain supplies of the material to be used in producing an instrument, and print heads 138 which dispense the material through nozzles onto a printing tray 139 in order to build or construct an item, such as a prepaid instrument or other object. Further details regarding components of a 3D printer and the various processes implemented at the printer in response to commands from a user system can be found, for example, in U.S. Pat. No. 7,589,868 issued to Velde et al., U.S. Pat. No. 7,996,101 issued to Menchik et al., US Patent Publication No. 2011/0241240 by Gothait et al., and US Patent Publication No. 2010/01408502 to Napadensky et al., each of which is hereby fully incorporated by reference.

As described earlier, instrument production data may be created at account management system 112 and stored at the data system 114, and sent by prepaid instrument issuer 110 when requested by user system 120 in order to produce an instrument at 3D printer 130. The instrument production data may in turn be stored in memory at the user system 120 in the form of a print file that may be used by the instrument printing application 126 in order to provide appropriate commands and production data to the 3D printer 130.

Figure 2:
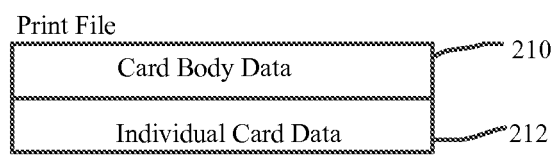
FIG. 2 illustrates instrument production data stored in a print file at a user system, for use in producing a financial instrument at a 3D printer.

An exemplary print file is illustrated in FIG. 2 and may include instrument body data 210 and individual instrument data 212. The instrument production data defines the printing layers deposited at the printing tray 139 for producing the instrument, with each layer represented, for example, in the form a data matrix. In such example, each element of the data matrix defines (1) the location in the layer where the material is to be deposited by the print heads 138 onto the printing tray 139 and (2) the type of material from one of the cartridges 126 that is to be used at that location (see, e.g., aforementioned U.S. Pat. No. 7,996,101). Thus, each layer may be built using materials that are represented by the instrument body data 210 and/or the individual instrument data 212. As should be appreciated, the inner layers within each instrument can form the substrate of the instrument and may be produced with materials deposited using instrument body data 210. The outer layers may include information and graphics that are unique to a specific instrument holder or requestor (but may also include some information and graphics that may be common to many instrument holders or requestors), and are thus may be produced with materials deposited using both instrument body data 210 and individual instrument data 212. The instrument printing application 126 will construct the commands and data sent to the 3D printer 130 to form each layer using the instrument body data 210 and/or the individual instrument data 212, selected for each layer as appropriate so that, after all the layers are deposited, the complete instrument is produced at the printing tray 139. It should be appreciated that an instrument may be produced using only instrument body data 210 (e.g., for production of a completely standardized instrument) or individual instrument data 212 (e.g., for production of a completely customized instrument).

Figure 3A:
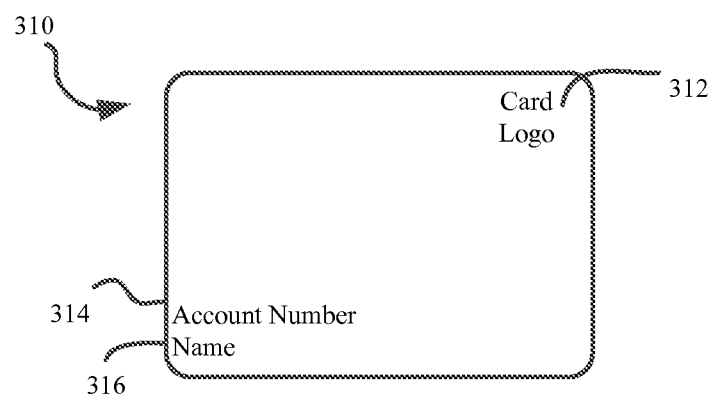
FIGS. 3A and 3B illustrate the front and rear sides of a financial instrument produced at the 3D printer seen in FIG. 1.
Figure 3B:
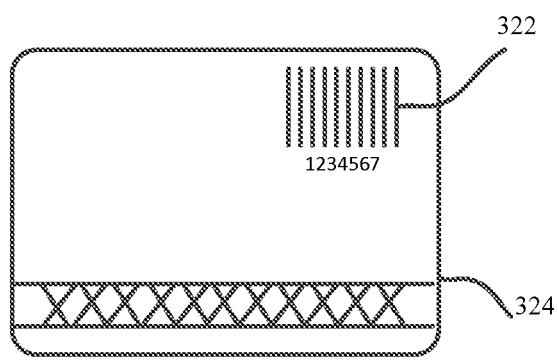

FIGS. 3A and 3B illustrate a card 310 produced by 3D printer 130. FIG. 3A shows the front side of the card with a card logo 312, an account number 314, and an account holder/cardholder name 316, each printed on the outer layer(s) of the front side of the card. FIG. 3B shows the backside of the card, with a UPC code 322 and a magstripe 324 printed on the outer layer(s) of the backside of the card. It should be appreciated that cards may produced that contain less than the information shown in FIGS. 3A and 3B. For example, the front side of the card may not have a card logo or account holder/cardholder name, and the backside of the card may not contain a UPC code or magstripe. In addition, the card may have additional information or material not shown in FIGS. 3A and 3B. For example, the card may have one or more photos, graphics, holograms, custom text, bar codes or QR codes. Although FIGS. 3A and 3B show a card, the 3D printer could be used to print any instrument.

In the illustrated embodiment, the card logo 312, the magstripe 324 and the overall structure and substrate of the card 310 are not unique to an individual cardholder and are thus defined by card body data 210. The account number 314, account holder name 316 are each unique to the cardholder (or the cardholder's account). Similarly, the barcode 322 may be unique. For example, the barcode 322 may represent a specific account number and can be read with an optical scanner when a transaction is conducted using the card 310. While the actual deposit of magnetically encodable material to form the magstripe 324 may be common to many cards, it should be appreciated that unique cardholder and/or account data may be electronically encoded into the magstripe separately from and after its production at the 3D printer 130. In addition, loyalty account data may be encoded into the magstripe separately from and after card production. While FIGS. 3A and 3B illustrate a card produced by a 3D printer, it should be noted that the 3D printer can be used to produce with available materials any object that can be used to represent value.

FIG. 4 is a flow diagram illustrating the overall process for producing prepaid instruments at the 3D printer 130 seen in FIG. 1.

Initially, the user system may request functionality in order to produce prepaid instruments at the user system 120 and the 3D printer 130, at step 410. Such a request may be made when the 3D printer is installed at the user system and, in response, the instrument issuer 110 may provide, at step 412, the instrument printing application 125 for downloading to the user system, to be stored at memory system 123 and thereafter accessed (and executed) when a instrument is to be produced on demand at the 3D printer. It should be appreciated, however, that in some circumstances and in lieu of performing steps 410 and 412, the user system 120 may be initially installed with the instrument printing application 125 preloaded in memory system 123 of the user system 120.

At step 416, the user system 120 may request, in response to a customer purchasing/ordering a prepaid instrument, instrument production data from the prepaid instrument issuer 110 in order to produce/print an individual prepaid instrument at the 3D printer 130. In response to the request at step 416, the prepaid instrument issuer may generate unique individual instrument data, which may be associated with an account being created for the requested prepaid instrument or may be associated with an existing account, and may combine the individual instrument data with general instrument body data stored at the instrument production data system 114 to form a print file (such as the print file seen in FIG. 2) representing instrument production data for the requested instrument. The instrument issuer 110 transmits the instrument production data through network 140 to the user system 120, at step 420. It should be appreciated that while the described embodiment envisions instrument body data (data common to many instruments) being created in advance and stored at the data system 114, and individual instrument data being produced as accounts are created, in some cases unique individual instrument data (such as data related to pre-established account numbers) may be created in advance and also stored in instrument production data system 114, in association with the related account data, and retrieved when an individual instrument is requested for production. Alternatively, unique individual instrument data may be entered into or uploaded to instrument production data system 114 during the purchasing/ordering process. It should be appreciated that person or entity purchasing/ordering a prepaid instrument may be the same as or different from the person or entity receiving the prepaid instrument. In addition, the purchasing/ordering of the prepaid instrument may occur at a user system that is the same as or different from the user system in communication with the 3D printer used to produce the prepaid instrument.

At step 422, the instrument production data provided by the prepaid instrument issuer may be stored in memory system 123 at user system 120. When the production of a instrument is to begin (such as by a request or command entered by the user at the user system 120), the user system may read the instrument production data for the requested instrument from memory system 123 (e.g., by accessing the memory system using one or more of an instrument number, account number, account ID, instrument holder ID or other identifier associated with the requested instrument and the print file), and may provide that data at step 424 to the 3D printer, under the control of the instrument printing application 125. After the instrument production data is read and provided to the 3D printer or otherwise used by the 3D printer, all or some of the individual instrument data may be scrambled, overwritten or deleted from memory system 123, step 430, in order to render it unusable in the future (thus making the instrument production data unusable for producing duplicates of a instrument, without authorization from the instrument issuer 110).

After the 3D printer receives the instrument production data, it produces the instrument at step 438 in a manner as described earlier involving the deposit of material by print heads 138 onto the printing tray 139.

While the embodiment of FIG. 4 provides for the scrambling, overwriting or deletion (step 430) of only the individual instrument data pertaining to the produced instrument, it should be appreciated that in other embodiments the entire print file (both instrument body data and individual instrument data) or select portions of one or both data sets could be scrambled, overwritten or deleted. The select portions could be pre-determined or randomly determined in each instance. However, if only the individual instrument data is rendered unusable after instrument production data is read at step 424, then the instrument body data for subsequently produced instruments may be retained, and the user system 120 would not need to retrieve both individual instrument data and instrument body data each time an instrument is to be produced. In some instances, instrument body data could be different depending upon the instrument to be produced (e.g., the user system 120 may be at a location where several different types of instruments are produced, with each instrument type having a different style, appearance or logo), and in those instances several different sets of instrument body data would need to be retained and retrieved at the user system 120 (along with the individual instrument data needed for specific instruments), depending on the specific instrument requested for production.

The instrument production data could be rendered unusable in a number of different ways. For example, the instrument production data could be simply deleted, with the print file or a portion thereof being made void of any useful data. As another example, the instrument production data could be scrambled or written over (e.g., with the bits in the print file having values that make them useless for printing an instrument). In yet another example, the print file may have one or more bits representing a marker, such that if the marker has a certain value (provided when the print file is used to produce an instrument), the print file is designated as unusable to the user system when it thereafter accesses the print file.

FIG. 5 illustrates a process implemented within user system 120 for preventing the unauthorized production of multiple instruments without authorization from the prepaid instrument issuer 110. In one embodiment, the process in FIG. 5 is implemented by instrument printing application 125, and largely occurs when the user system attempts to read data at step 424 in order to produce an instrument at 3D printer 130.

As seen in FIG. 5, a request for production/printing of an instrument may be made at step 510 by a user at the user system 120, such as by entering the account number, instrument ID, instrument holder ID or other identifier associated with requested instrument, and the user system retrieves/reads the print file pertaining to the requested instrument at step 512. The user system 120 determines, at step 516, whether the print file is usable (instrument production data has not been scrambled, overwritten or deleted from the print file). If the data is usable (e.g., because this is the first attempt to produce the instrument at the user system), the process continues with the instrument production data provided to the 3D printer at step 520. If, however, the instrument production data has been rendered unusable in the print file at step 516 (e.g., the requested instrument has been previously produced), then the printing or production process is stopped at step 530 (and an appropriate message can be displayed to the user at the user system indicating the production of the instrument has not been authorized).

Figure 6:
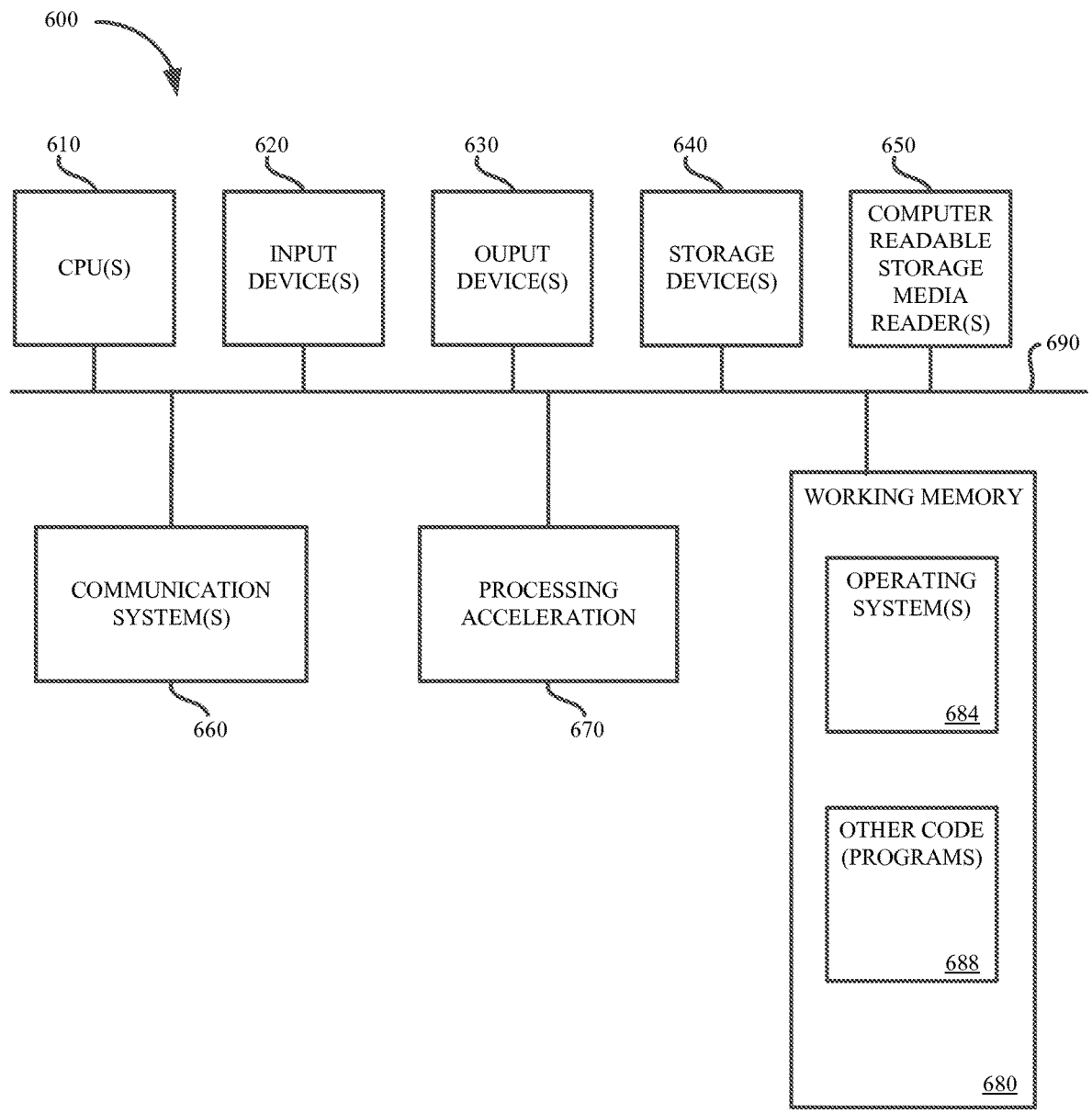
FIG. 6 is a block diagram illustrating an exemplary computer system upon which embodiments of the present invention may be implemented.

FIG. 6 is a block diagram illustrating an exemplary computer system upon which embodiments of the present invention may be implemented. This example illustrates a computer system 600 such as may be used, in whole, in part, or with various modifications, to provide the functions of the account management system 112, user system 120, and controller 134, as well as other components and functions of the systems described herein.

The computer system 600 is shown comprising hardware elements that may be electrically coupled via a bus 690. The hardware elements may include one or more central processing units 610, one or more input devices 620 (e.g., a mouse, a keyboard, etc.), and one or more output devices 630 (e.g., a display device, a printer, etc.). The computer system 600 may also include one or more storage devices 640, representing remote, local, fixed, and/or removable storage devices and storage media for temporarily and/or more permanently containing computer-readable information, and one or more storage media reader(s) 650 for accessing the storage device(s) 640. By way of example, storage device(s) 640 may be disk drives, optical storage devices, solid-state storage device such as a random access memory ("RAM") and/or a read-only memory ("ROM"), which can be programmable, flash-updateable or the like.

The computer system 600 may additionally include a communications system 660 (e.g., a modem, a network instrument—wireless or wired, an infra-red communication device, a Bluetooth™ device, a near field communications (NFC) device, a cellular communication device, etc.). The communications system 660 may permit data to be exchanged with a network, system, computer, mobile device and/or other component as described earlier. The system 600 also includes working memory 680, which may include RAM and ROM devices as described above. In some embodiments, the computer system 600 may also include a processing acceleration unit 670, which can include a digital signal processor, a special-purpose processor and/or the like.

The computer system 600 may also comprise software elements, shown as being located within a working memory 660, including an operating system 684 and/or other code 688. Software code 688 may be used for implementing functions of various elements of the architecture as described herein (such as functions performed by the instrument printing application 125 and 3D printer driver 126). For example, software stored on and/or executed by a computer system, such as system 600, can be used in implementing the processes seen in FIGS. 4 and 5.

It should be appreciated that alternative embodiments of a computer system 600 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the user system 120 may be implemented by a single system having one or more storage device and processing elements. As another example, the user system 120 may be implemented by plural systems, with their respective functions distributed across different systems at one or more locations (such as homes, offices, retailer locations or money transfer locations).

Moreover, while the various flows and processes described herein (e.g., those illustrated in FIGS. 4 and 5) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Consequently, although the invention has been described with respect to exemplary embodiments, it will be appreciated that the invention is intended to cover all modifications and equivalents within the scope of the following claims.

While detailed description of presently preferred embodiments of the invention has been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A method for production of a three-dimensional printed object at a remote location, the method comprising:
    receiving, at a host computer system, a request from a user system at the remote location for a printed object;
    in response to the request, generating at the host computer system a print file, wherein the print file comprises a plurality of data matrices storing instrument production data, wherein each of the plurality of data matrices defines a separate printing layer to be deposited at a printing tray of a 3D printer for producing the printed object, and wherein the print file comprises:
        a first subset of data matrices corresponding to one or more of the separate printing layers that do not contain individual instrument data associated with a user;
        a second subset of data matrices corresponding to one or more of the separate printing layers that do contain individual instrument data associated with the user, wherein the individual instrument data includes an account number associated with the user;
    sending, from the host computer system, the print file to the user system;
    storing the print file at the user system for use by the 3D printer;
    transmitting the print file from the user system to the 3D printer;
    after transmitting the print file from the user system to the 3D printer, scrambling the second subset of data matrices within the print file to render unusable, by the 3D printer, the second subset of data matrices,
    producing, based on the print file, a first three-dimensional printed object, the first three-dimensional printed object containing printing layers associated with the first subset of data matrices and the second subset of data matrices; and
    producing, based on the print file, a second three-dimensional printed object, the second three-dimensional printed object containing printing layers associated with the first subset of data matrices, but not the second subset of data matrices.

2. The method of claim 1, further comprising:
    prior to providing the print file from the user system to the 3D printer, determining whether the print file at the user system is usable; and if the print file at the user system is not usable, stopping the production of the printed object at the 3D printer.

3. The method of claim 1, wherein the individual instrument data comprises an instrument holder ID.

4. The method of claim 1, wherein the sending the print file from the host computer system to the user system comprises transmitting the print file over a public unencrypted network.

5. The method of claim 1, wherein the sending the print file from the host computer system to the user system comprises transmitting the print file over a dedicated private telecommunication network.

6. The method of claim 1, wherein scrambling the second subset of data matrices further comprises:
setting, at the user system, one or more designated bits representing a marker within the print file to a predetermined value, wherein when the designated bits representing the marker are set to the predetermined value, the print file is designated as unusable.

7. The method of claim 1, wherein the first three-dimensional printed object produced at the 3D printer comprises a card object having a bar code representing encoded account-specific data.

8. The method of claim 1, wherein the first three-dimensional printed object produced at the 3D printer comprises non-card physical object.

9. The method of claim 1, further comprising:
receiving, at the host computer system, a second request from the user system at the remote location for the second three-dimensional printed object;
generating an updated portion of the print file, wherein the updated portion of the print file includes updated versions of the one or more data matrices storing individual instrument data of the second three-dimensional printed object that are unique to at least one of a second user; and
sending the updated portion of the print file from the host computer system to the user system in response to the second request, wherein the updated portion of the print file storing the first subset of data matrices of the printed object is not sent to the user system in response to the second request.

10. The method of claim 9, further comprising:
receiving, by the user system, the updated portion of the print file from the host computer system;
retrieving, by the user system, the first subset of data matrices of the print file, stored within memory of the user system;
generating, by the user system, a second print file based on (1) the first subset of data matrices received from the memory of the user system, and (2) the updated portion of the print file received from the host computer system; and
producing, by the user system, the second three-dimensional printed object at the 3D printer using the second print file.

11. The method of claim 1, wherein the rendering unusable the at least a portion of the print file is performed via an instrument printing application executing on the user system.

12. A method for production of a three-dimensional printed object for an instrument holder at a remote location, the method comprising:
receiving, at a host computer system, a request from a user system at the remote location for a printed object;
in response to the request, generating at the host computer system a print file, wherein the print file comprises a plurality of data matrices storing instrument production data, wherein each of the plurality of data matrices defines a separate printing layer to be deposited at a printing tray of a 3D printer for producing the printed object, and wherein the print file comprises:
a first subset of data matrices corresponding to one or more of the separate printing layers that do not contain individual instrument data associated with a user;
a second subset of data matrices corresponding to one or more of the separate printing layers that do contain individual instrument data associated with the user, wherein the individual instrument data includes an account number;
sending, from the host computer system, the print file to the user system;
storing the print file at the user system for use by the 3D printer;
transmitting the print file from the user system to the 3D printer;
after transmitting the print file from the user system to the 3D printer, scrambling the second subset of data matrices within the print file to render unusable, by the 3D printer, the second subset of data matrices;
producing, based on the print file, a first three-dimensional printed object, the first three-dimensional printed object containing printing layers associated with the first subset of data matrices and the second subset of data matrices; and
producing, based on the print file, a second three-dimensional printed object, the second three-dimensional printed object containing printing layers associated with the first subset of data matrices, but not the second subset of data matrices.

13. The method of claim 12, further comprising:
prior to providing the print file from the user system to the 3D printer, determining whether the print file at the user system is usable; and
if the print file at the user system is not usable, stopping the production of the printed object at the 3D printer.

14. A system for producing three-dimensional physical instruments for instrument holders at a remote location, the system comprising:
a 3D printer comprising:
a controller comprising one or more computer processors;
one or more cartridges storing therein materials for producing physical instruments;
one or more print heads configured to dispense the materials from the cartridges onto a printing tray in order to construct the physical instruments; and
a memory device in communication with the controller, having stored thereon sets of instructions which, when executed by the controller, cause the 3D printer to:
receive a print file from a user system via a 3D printer driver, the print file comprising a plurality of layers; and
produce, by the controller, the physical instrument at the 3D printer using the one or more cartridges and the one or more print heads to deposit the plurality of layers in order to generate the physical instrument in accordance with the received print file; and
the user system comprising:
a processing unit comprising one or more computer processors; and a memory device in communication with the processing unit, having stored thereon:
   a physical instrument printing application;
   a 3D printer driver configured to access the 3D printer; and
   one or more sets of instructions which, when executed by the one or more computer processors, cause the user system to:
      receive, using the physical instrument printing application, a first print file corresponding to a first physical instrument, from a host computer, wherein the first print file comprises a plurality of data matrices storing instrument production data, wherein each of the plurality of data matrices defines a separate printing layer to be deposited at a printing tray of the 3D printer for producing a printed object, and wherein the print file comprises:
         a first subset of data matrices corresponding to one or more of the separate printing layers that do not contain individual instrument data associated with a user;
         a second subset of data matrices corresponding to one or more of the separate printing layers that do contain individual instrument data associated with the user, wherein the individual instrument data includes an account number;
      store, by the physical instrument printing application, the print file in memory of the user system;
      translate the print file using the 3D printer driver, and transmit the translated print file from the user system to the 3D printer; and
      after transmitting the print file from the user system to the 3D printer using the 3D printer driver, scramble the second subset of data matrices within the print file to render unusable, by the 3D printer, the second subset of data matrices.

15. The system of claim 14, the memory of the user system including further instructions, which, when executed by the one or more computer processors, cause the user system to:
   receive, via the physical instrument printing application, data from the host computer corresponding to individual instrument data for a second physical instrument, wherein the first subset of data matrices is not received with the individual instrument data for the second physical instrument;
   retrieve the first subset of data matrices received within the first print file corresponding to a first physical instrument;
   generate a second print file using the retrieved first subset of data matrices received within the first print file, combined with the individual instrument data corresponding to the second physical instrument; and
   provide the second print file to the 3D printer, using the 3D printer driver.

16. The system of claim 15, wherein the rendering unusable the second subset of data matrices comprises invoking the 3D printer driver on the user system using the physical instrument printing application.

* * * * *